US011005250B2

(12) United States Patent
Ciesielczyk et al.

(10) Patent No.: US 11,005,250 B2
(45) Date of Patent: *May 11, 2021

(54) INSULATING STRUCTURE

(71) Applicant: Preformed Line Products Co., Mayfield Village, OH (US)

(72) Inventors: Benjamin Franklin Ciesielczyk, North Lawrence, OH (US); Adam Michael Deel, Bay Village, OH (US); Lan-Ping Ling, Beachwood, OH (US); Cameron Joseph Clines, Gates Mills, OH (US); Jacob Jeffrey Palmer, Chesterland, OH (US)

(73) Assignee: Preformed Line Products Co., Mayfield Village, OH (US)

( * ) Notice: Subject to any disclaimer, the term of this patent is extended or adjusted under 35 U.S.C. 154(b) by 70 days.

This patent is subject to a terminal disclaimer.

(21) Appl. No.: 16/037,044

(22) Filed: Jul. 17, 2018

(65) Prior Publication Data

US 2020/0028343 A1 Jan. 23, 2020

(51) Int. Cl.
| | |
|---|---|
| *H02G 3/32* | (2006.01) |
| *F16L 3/12* | (2006.01) |
| *H02G 3/04* | (2006.01) |
| *F16B 2/02* | (2006.01) |
| *H02G 3/30* | (2006.01) |

(52) U.S. Cl.
CPC ............ *H02G 3/32* (2013.01); *F16B 2/02* (2013.01); *F16L 3/12* (2013.01); *H02G 3/0437* (2013.01); *H02G 3/305* (2013.01)

(58) Field of Classification Search
CPC ........ H02G 3/32; H02G 3/0437; H02G 3/305; H02G 3/30; H02G 3/126; H02G 3/263; H02G 7/056; H02G 15/115; H02G 3/04; H02G 3/14; H02G 9/10; F16L 3/12; F16L 3/1211; F16L 3/123; F16L 3/00; F16L 3/1215; F16L 3/08; F16L 3/10; F16B 2/02
USPC ............ 174/163 R, 168, 172, 174, 154, 155
See application file for complete search history.

(56) References Cited

U.S. PATENT DOCUMENTS

| | | | | |
|---|---|---|---|---|
| 9,859,695 | B2 * | 1/2018 | Burns | ................ H02G 3/0406 |
| 10,134,509 | B1 * | 11/2018 | Pyron | ...................... H02G 7/05 |
| 2010/0102175 | A1 * | 4/2010 | Dockery | ................... F16L 3/23 248/74.3 |
| 2017/0108144 | A1 * | 4/2017 | Olszewski | ............. F16B 2/005 |

(Continued)

*Primary Examiner* — William H. Mayo, III
*Assistant Examiner* — Krystal Robinson
(74) *Attorney, Agent, or Firm* — Cooper Legal Group, LLC

(57) ABSTRACT

A structure for supporting a wire includes a first portion including a body portion, and an alignment portion. The alignment portion defines a first alignment opening through which the alignment portion receives a first fastener. The first alignment opening extends along a first alignment axis between. A second portion defines a second alignment opening, extending along a second alignment axis, through which the second portion receives the first fastener. The second portion is spaced a distance from the body portion to define a wire opening into which the wire is received for support by the structure. The alignment portion is movable relative to the body portion between a first position, in which the first alignment axis and the second alignment axis are coaxial, and a second position, in which the first alignment axis and the second alignment axis are non-coaxial.

20 Claims, 15 Drawing Sheets

(56) References Cited

U.S. PATENT DOCUMENTS

| | | | |
|---|---|---|---|
| 2019/0044315 A1* | 2/2019 | Ciesielczyk | F16G 11/03 |
| 2020/0028343 A1* | 1/2020 | Ciesielczyk | F16B 2/12 |
| 2020/0112157 A1* | 4/2020 | Ling | H02G 7/056 |
| 2020/0198662 A1* | 6/2020 | Deel | B61B 7/00 |

* cited by examiner

INSULATING STRUCTURE

TECHNICAL FIELD

The instant application is generally directed towards an insulating structure for supporting a wire.

BACKGROUND

An insulating structure can support a wire. The wire can include a conductor, for example.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a structure for supporting a wire comprises a first portion comprising a body portion, and an alignment portion movably coupled to the body portion. The alignment portion defines a first alignment opening through which the alignment portion is configured to receive a first fastener. The first alignment opening extends along a first alignment axis between a first side of the alignment portion and a second side of the alignment portion. A second portion defines a second alignment opening, extending along a second alignment axis, through which the second portion is configured to receive the first fastener such that the second portion is attached to the first portion by the first fastener when the first fastener is received within the first alignment opening and the second alignment opening. The second portion is spaced a distance from the body portion to define a wire opening into which the wire is received for support by the structure. The alignment portion is movable relative to the body portion between a first position, in which the first alignment axis and the second alignment axis are coaxial, and a second position, in which the first alignment axis and the second alignment axis are non-coaxial.

In an example, a structure for supporting a wire comprises a first portion comprising a body portion, and an alignment portion movably coupled to the body portion. The alignment portion defines a first alignment opening through which the alignment portion is configured to receive a first fastener. A second portion defines a second alignment opening through which the second portion is configured to receive the first fastener such that the second portion is attached to the first portion by the first fastener when the first fastener is received within the first alignment opening and the second alignment opening. The second portion is spaced a distance from the body portion to define a wire opening into which the wire is received for support by the structure. The alignment portion is movable relative to the body portion between a first position, in which the wire opening is bounded by the first portion, the second portion, and the first fastener, and a second position, in which the wire opening is not bounded by the first fastener, and the first fastener is spaced a distance apart from the second portion.

In an example, a structure for supporting a wire comprises a first portion comprising a body portion, and an alignment portion movably coupled to the body portion. The alignment portion defines a first alignment opening through which the alignment portion is configured to receive a first fastener. The first alignment opening extends along a first alignment axis between a first side of the alignment portion and a second side of the alignment portion. A second portion defines a second alignment opening, extending along a second alignment axis, through which the second portion is configured to receive the first fastener such that the second portion is attached to the first portion by the first fastener when the first fastener is received within the first alignment opening and the second alignment opening. The second portion is spaced a distance from the body portion to define a wire opening into which the wire is received for support by the structure. The alignment portion is movable relative to the body portion between a first position, in which the first fastener maintains the wire within the wire opening, and a second position, in which the first fastener does not maintain the wire within the wire opening.

The following description and annexed drawings set forth certain illustrative aspects and implementations. These are indicative of but a few of the various ways in which one or more aspects can be employed. Other aspects, advantages, and novel features of the disclosure will become apparent from the following detailed description when considered in conjunction with the annexed drawings.

DETAILED DESCRIPTION

Figure 1:
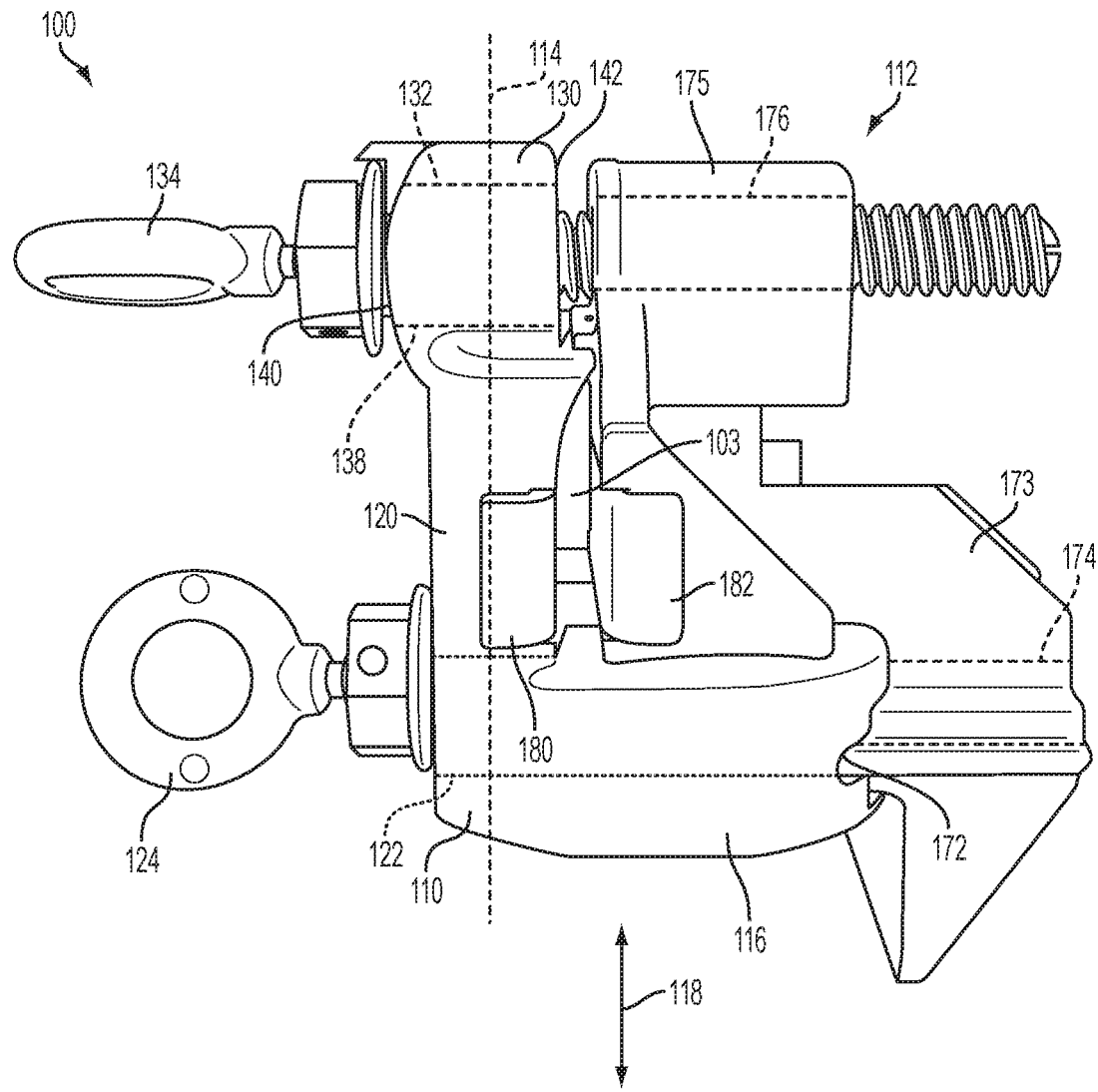
FIG. 1 illustrates an example insulating structure.
Figure 1:
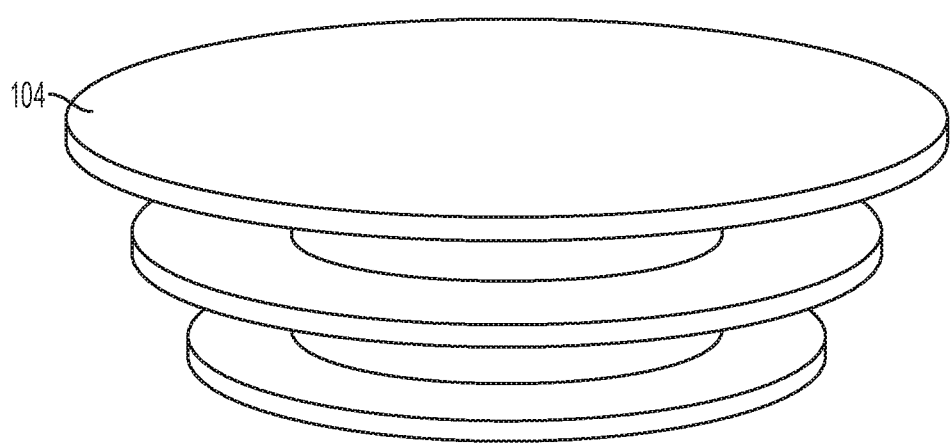

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter. At least some dimensions in the drawing may not be to scale.

Figure 2:
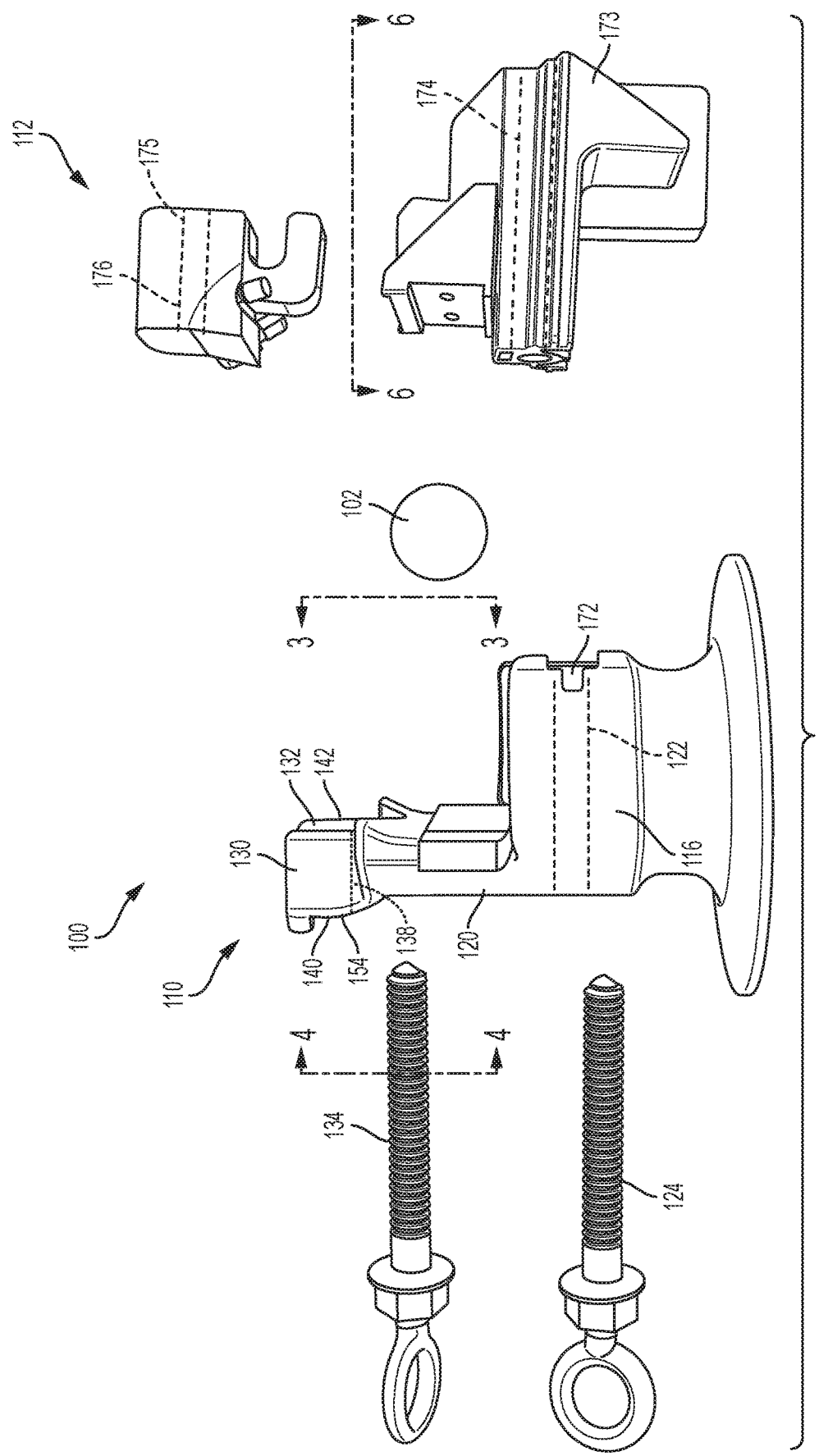
FIG. 2 illustrates an exploded view of the insulating structure of FIG. 1.

Turning to FIGS. 1 and 2, an example structure 100 for supporting a wire 102 (wire 102 illustrated in FIG. 2) is illustrated. It will be appreciated that FIG. 2 is an exploded illustration of the structure 100 of FIG. 1. In some examples, the wire 102 comprises an electrical conductor. The wire 102 includes any number of sizes, shapes, constructions, etc. Indeed, in other examples, the wire 102 may be larger or smaller in cross-sectional size than as illustrated. The wire 102 can be received within a wire opening 103 of the structure 100.

In an example, the structure 100 can be supported by an electrical insulator 104. For example, the structure 100 can be attached to the electrical insulator 104, such that the structure 100 rests upon and is supported by the electrical insulator 104. The electrical insulator 104 can withstand operating voltage and electrical surges. The electrical insulator 104 can include any number of materials. In an example, the electrical insulator 104 includes porcelain, though other materials are envisioned, including ceramic, glass, polymers, or the like. In the illustrated example, the electrical insulator 104 may include one or more sheds that project radially outwardly from a center of the electrical insulator 104.

The structure 100 may include a first portion 110 and a second portion 112. In an example, the first portion 110 and the second portion 112 of the structure 100 may include a non-conductive material, such as nylons, plastics, polymers, or the like.

The first portion 110 of the structure 100 can extend along a first axis 114. In an example, the first portion comprises a base portion 116. The base portion 116 may comprise a lower portion of the first portion 110. In an example, the base portion 116 can be attached 118 (illustrated generically/schematically with arrowheads) to the electrical insulator 104. The base portion 116 can be attached 118 in any number of ways, such as with adhesives, mechanical fasteners (e.g., nuts, bolts, screws, etc.), locking/threading attachment, or the like. In an example, the base portion 116 can be molded and/or formed as a single piece with the electrical insulator 104.

The first portion 110 of the structure 100 comprises a first body portion 120. In an example, the first body portion 120 may extend from an end of the base portion 116 along the first axis 114. The first body portion 120 comprises any number of heights/lengths (e.g., such as by extending a longer or shorter distance vertically), and is not limited to the specific dimensions illustrated herein. In an example, as illustrated in FIG. 2, the first body portion 120 defines a body opening 122 into which a fastener (e.g., second fastener 124) can be received. The body opening 122 may be disposed at a lower end of the first body portion 120, such that the body opening 122 is aligned with the base portion 116. The second fastener 124 comprises any number of fasteners that are sized/shaped to be received within the body opening 122. For example, the second fastener 124 can include screws, bolts, etc. and, in some examples, may be threaded.

The first portion 110 of the structure 100 comprises a first alignment portion 130 coupled to the first body portion 120. In an example, the first alignment portion 130 is coupled to an end of the first body portion 120 that is opposite the base portion 116. The first alignment portion 130 defines a first alignment opening 132 through which the first alignment portion 130 can receive a first fastener 134. In an example, the first alignment opening 132 is at least partially defined by a lower wall 138. The first alignment opening 132 can extend through the first alignment portion 130 between a first side 140 of the first alignment portion 130 and a second side 142 of the first alignment portion 130.

In an example, the first side 140 of the first alignment portion 130 surrounding the first alignment opening 132 may comprise an angled surface 154. The angled surface 154 of the first side 140 includes any number of shapes. In the illustrated example, this angled surface 154 comprises a shape that has a peak width adjacent the midpoint of the first alignment opening 132 along the first axis 114. The illustrated angled surface 154 is not intended to be limiting, however, and in other examples, may have a conic shape.

The structure 100 may comprise the second portion 112. In an example, the second portion 112 can engage with the first portion 110 such that the second portion 112 is movably attachable to the first portion 110. In an example, the base portion 116 of the first portion 110 defines a channel 172 into which a lower portion of the second portion 112 can be received.

The second portion 112 of the structure 100 comprises a second body portion 173 and a second alignment portion 175. The second body portion 173 may define a lower portion of the second portion 112, and can at least partially be received within the channel 172 of the first portion 110. In an example, the second body portion 173 defines a fastener opening 174 extending at least partially through the second portion 112. The fastener opening 174 may be sized and/or shaped to receive the second fastener 124. In an example, the fastener opening 174 may be threaded such that the second fastener 124 can threadingly engage the fastener opening 174 so as to movably attach the first portion 110 to the second portion 112. In such an example, the second fastener 124 can be tightened/loosened (e.g., by rotating clockwise or counterclockwise) such that the second portion 112 and the first portion 110 can be moved closer together or farther apart.

The second alignment portion 175 can define a second alignment opening 176 through which the second portion 112 can receive the first fastener 134 such that the second portion 112 is attached to the first portion 110. In some examples, the second alignment opening 176 and the second alignment portion 175 may be positioned at an upper end of the second portion 112 opposite the fastener opening 174. The second alignment opening 176 is sized/shaped to receive the first fastener 134. In an example, the second alignment opening 176 may be threaded such that the first fastener 134 can threadingly engage the second alignment opening 176 so as to movably attach the first portion 110 to the second portion 112. In such an example, the first fastener 134 can be tightened/loosened (e.g., by rotating clockwise or counterclockwise) such that the second portion 112 and the first portion 110 can be moved closer together or farther apart. As will be described herein, the second alignment portion 175 can be movably coupled to the second body portion 173.

The structure 100 can include a first mating portion 180 and a second mating portion 182. In an example, the first mating portion 180 may be attached to the first portion 110 while the second mating portion 182 may be attached to the second body portion 173 of the second portion 112. The first mating portion 180 can be attached to the first portion 110 in any number of ways, such as with adhesives, fasteners (e.g., screws, bolts, etc.), locking structures, snap fit attachment (e.g., first mating portion 180 received within slot in first portion 110) or the like. Likewise, the second mating portion 182 can be attached to the second body portion 173 of the second portion 112 in any number of ways, such as with adhesives, fasteners (e.g., screws, bolts, etc.), locking structures, snap fit attachment (e.g., second mating portion 182 received within slot in second portion 112) or the like.

The first mating portion 180 and the second mating portion 182 can contact/engage the wire 102 when the wire 102 is positioned within and/or supported by the structure 100. In an example, the wire 102 may be sandwiched between the first mating portion 180 and the second mating portion 182. The first mating portion and the second mating portion 182 comprise any number of materials. In an example, the first mating portion and the second mating portion 182 comprise a conductive material, such as metals (e.g., bronze, for example). In other examples, the first mating portion and the second mating portion 182 comprise a non-conductive material, such as nylons, plastics, or the like.

Figure 3:
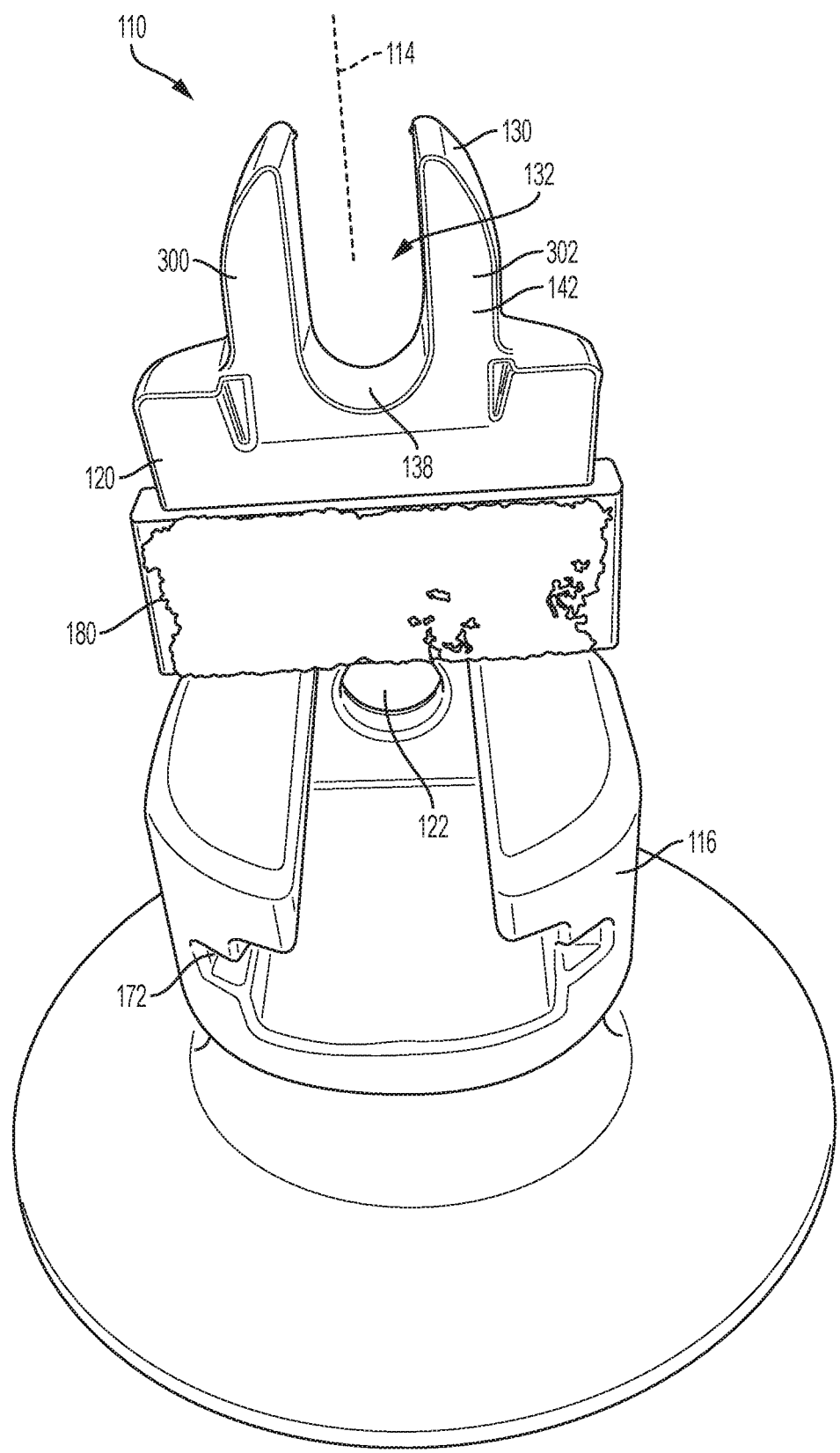
FIG. 3 illustrates a perspective view taken along line 3-3 of FIG. 2.

Referring to FIG. 3, the first portion 110 is illustrated as viewed from the perspective indicated by lines 3-3 of FIG. 2. In an example, the first portion 110 comprises a first lateral wall 300 and a second lateral wall 302. The first lateral wall 300 and the second lateral wall 302 may be spaced apart to define the first alignment opening 132. In an example, the first lateral wall 300 and the second lateral wall 302 may project from the lower wall 138 in a direction away from the base portion 116. In this way, the lower wall 138 can extend between the first lateral wall 300 and the second lateral wall 302 (e.g., at a lower end of the first lateral wall 300 and a second lower end of the second lateral wall 302).

In an example, the first alignment opening 132 may be unbounded opposite the lower wall 138. That is, the first lateral wall 300 and the second lateral wall 302 may not be attached at a location opposite the lower wall 138. In this way, the first alignment opening 132 may be bordered on three sides (e.g., by the lower wall 138, the first lateral wall 300, and the second lateral wall 302) but not on a fourth side. In an example, a distance separating the first lateral wall 300 and the second lateral wall 302 may be constant along the first axis 114. The distance separating the first lateral wall 300 and the second lateral wall 302 may be greater than a cross-sectional size of the fastener (e.g., the first fastener 134) such that the fastener (e.g., the first fastener 134) may be removably received within the first alignment opening 132.

Figure 4:
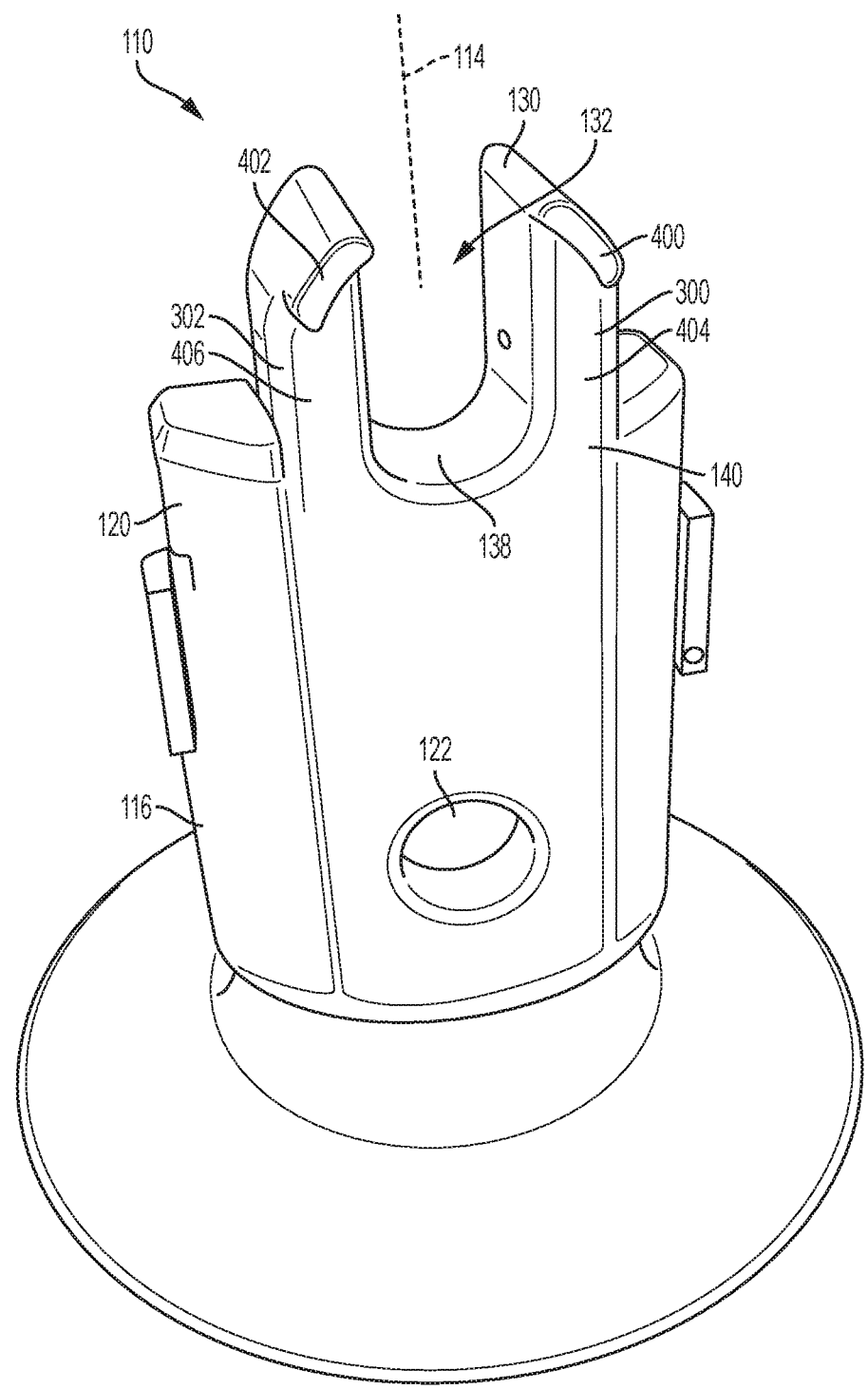
FIG. 4 illustrates a perspective view taken along line 4-4 of FIG. 2.
Figure 5:
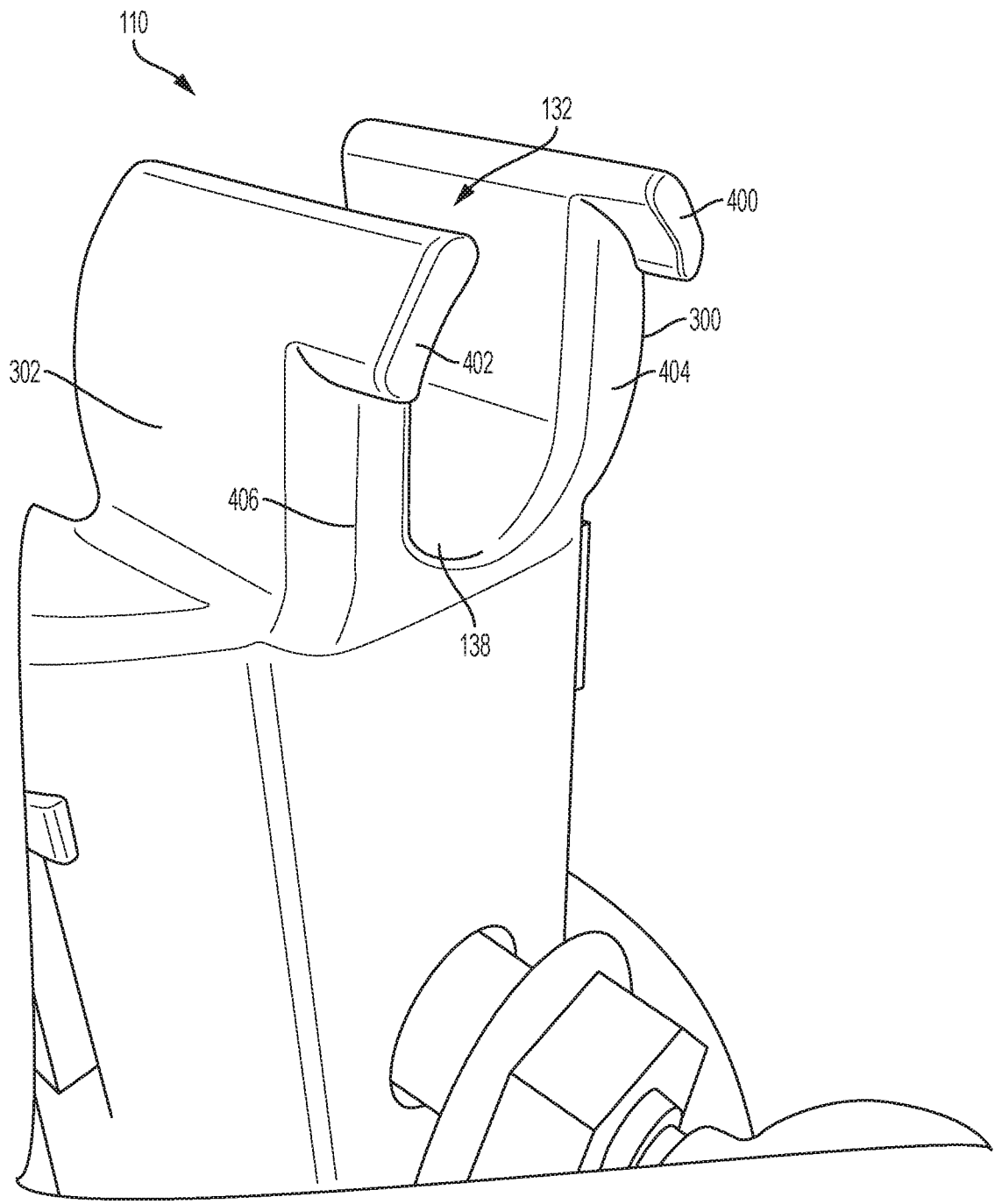
FIG. 5 is similar to FIG. 4.

Referring to FIGS. 4 and 5, the first portion 110 is illustrated as viewed from the perspective indicated by lines 4-4 of FIG. 2. In an example, the first portion 110 comprises a first retention structure 400 and a second retention structure 402. For example, the first retention structure 400 may be attached to the first lateral wall 300 while the second retention structure 402 may be attached to the second lateral wall 302. It will be appreciated that being attached to is not limited to being separately coupled (e.g., with fasteners, adhesives, mechanical locking structures, etc.). Rather, in an example, the first retention structure 400 and/or the second retention structure 402 can be attached to the first lateral wall 300 and/or the second lateral wall 302, respectively, by being formed with (e.g., one piece formed), separately coupled to, etc.

The first retention structure 400 and the second retention structure 402 can project outwardly from the first lateral wall 300 and the second lateral wall 302, respectively, along a direction that is non-parallel to the first axis 114. In an example, this direction may be perpendicular to the first axis 114. In this way, the first retention structure 400 may be non-planar with a first front side 404 of the first lateral wall 300. In an example, the second retention structure 402 may be non-planar with a second front side 406 of the second lateral wall 302. For example, the first retention structure 400 may project outwardly a distance from the first front side 404 while the second retention structure 402 may project outwardly from the second front side 406.

As will be explained herein, the first retention structure 400 and the second retention structure 402 can assist in maintaining the fastener (e.g., the first fastener 134) within the first alignment opening 132. It will be appreciated that the first retention structure 400 and the second retention structure 402 may comprise any number of shapes. For example, the first retention structure 400 may be angled (e.g., non-parallel) relative to an axis along which the first lateral wall 300 extends (e.g., with the first lateral wall 300 extending parallel to the first axis 114). In an example, the second retention structure 402 may be angled (e.g., non-parallel) relative to an axis along which the second lateral wall 302 extends (e.g., with the second lateral wall 302 extending parallel to the first axis 114). In this way, a head of the first fastener 134 can contact and/or abut the first retention structure 400 and/or the second retention structure 402 when the first fastener 134 is received within the first alignment opening 132.

Figure 6:
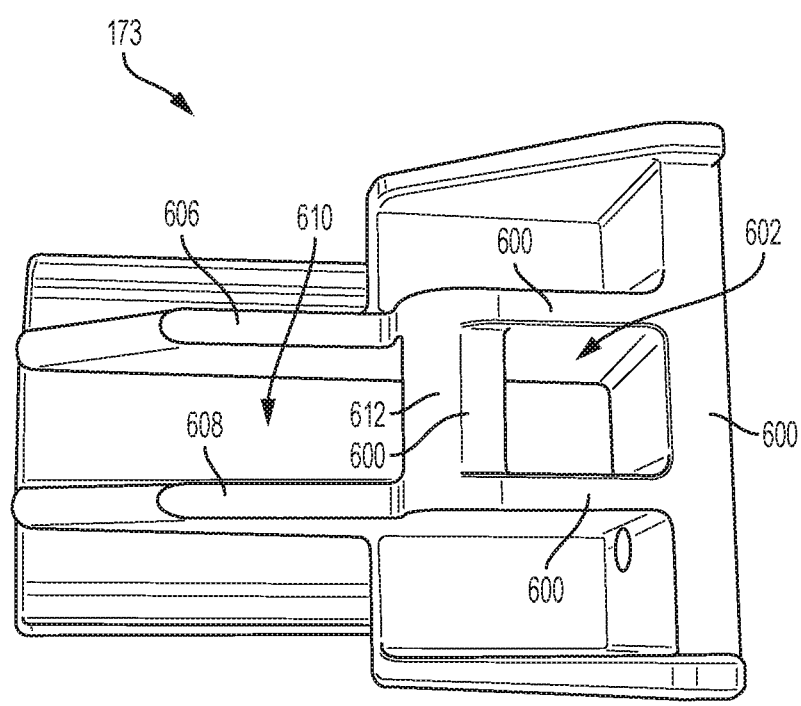
FIG. 6 illustrates a detail view of a second body portion taken along line 6-6 of FIG. 2.

Referring to FIG. 6, the second body portion 173 is illustrated as viewed from the perspective indicated by lines 6-6 of FIG. 2. In an example, the second body portion 173 comprises one or more body portion walls 600. The body portion walls 600 can be located at an upper side of the second body portion 173 and may face the second alignment portion 175 (e.g., illustrated in FIGS. 1 and 2). The body portion walls 600 can be spaced apart to define a body portion opening 602. In an example, the body portion opening 602 has a substantially quadrilateral shape (e.g., due to the body portion walls 600 extending linearly), though other shapes are envisioned.

In an example, the second body portion 173 comprises a first rearward wall 606 and a second rearward wall 608. The first rearward wall 606 and the second rearward wall 608 may be disposed adjacent to a rear side of the body portion opening 602. In an example the first rearward wall 606 and the second rearward wall 608 may extend substantially parallel to two of the body portion walls 600 (e.g., co-planar with two of the body portion walls 600), and substantially perpendicular to two of the body portion walls 600.

The first rearward wall 606 and the second rearward wall 608 can be spaced apart to define a rearward channel 610. In an example, the rearward channel 610 may be disposed on a rearward side of the body portion walls 600 and the body portion opening 602. In an example, the rear channel 610 may extend underneath a rear body portion wall 612 of the body portion walls 600. For example, the body portion opening 602 may be located on one side of the rear body portion wall 612 while the reward channel 610 may be located on another side of the rear body portion wall 612. In this way, the body portion opening 602 and the rearward channel 610 may be in communication with each other, such that an object can be disposed within the body portion opening 602 and/or the rearward channel 610 while also passing between the body portion opening 602 and the rearward channel 610.

Figure 7:
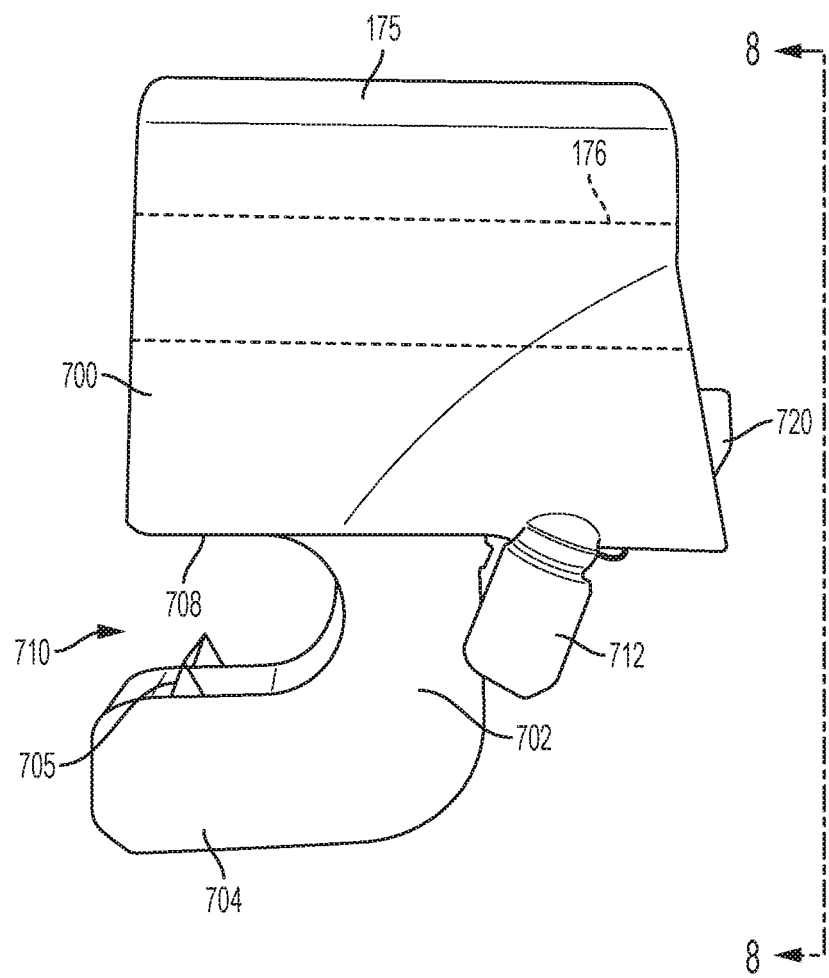
FIG. 7 illustrates a detail view of a second alignment portion from the device of FIG. 2.
Figure 8:
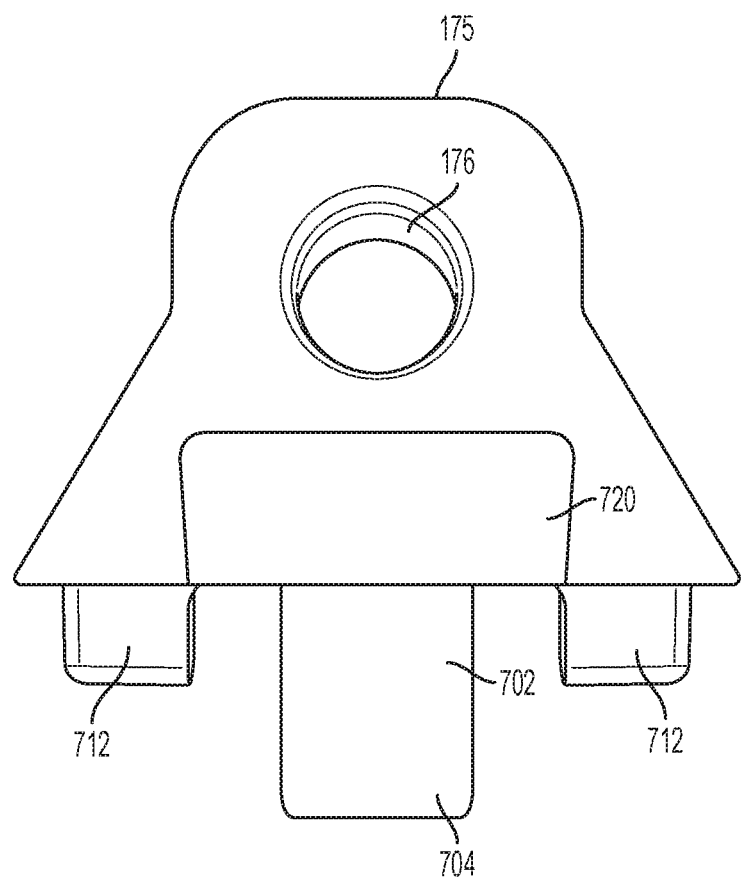
FIG. 8 illustrates a detail view of the second alignment portion taken along line 8-8 of FIG. 7.

Referring to FIGS. 7 and 8, an example of the second alignment portion 175 of the second portion 112 is illustrated. In an example, the second alignment portion 175 comprises an alignment body 700. The alignment body 700 defines the second alignment opening 176 through which a fastener may extend. In an example, the alignment body 700 has a substantially cubic shape, though other shapes are envisioned.

The second alignment portion 175 comprises one or more alignment projections that project from a surface of the second alignment portion 175. For example, the second alignment portion 175 may comprise a first alignment projection 702 and a second alignment projection 704. The first alignment projection 702 may project from a bottom surface 708 of the alignment body 700. The second alignment projection 704 may be coupled to the first alignment projection 702. In an example, the first alignment projection 702 may extend along an axis, while the second alignment projection 704 may extend along a second axis that is non-parallel to the axis. For example, the second axis (e.g., and the second alignment projection 704) may extend substantially perpendicular to the axis (e.g., and the alignment projection 702).

The second alignment portion 704 may be spaced apart from a bottom surface 708 of the alignment body 700 to define an alignment opening 710. In an example, the alignment opening 710 may be defined between the first alignment projection 702, the second alignment projection 704, and the bottom surface 708 of the alignment body 700. In an example, an inner surface of the first alignment projection 702 facing the alignment opening 710 may be rounded or curved. As will be explained below, a portion of the second body portion 173 may be received within the alignment opening 710. In an example, the second alignment portion 704 comprises an alignment outcropping 705 that projects from the second alignment portion 704 towards the alignment body 700. In this way, the alignment outcropping 705 can assist in maintaining a structure (e.g., the rear body portion wall 612) within the alignment opening 710.

In an example, the second alignment portion 175 comprises a ramped surface 720. The ramped surface 720 may be positioned along a surface of the alignment body 700. In an example, the ramped surface 720 may define a slope or angle that is non-parallel with respect to the surface of the alignment body 700 from which the ramped surface 720 extends. The ramped surface 720 may be ramped so as to assist in maintaining the wire 102 between the first portion 110 and the second portion 112.

Figure 9:
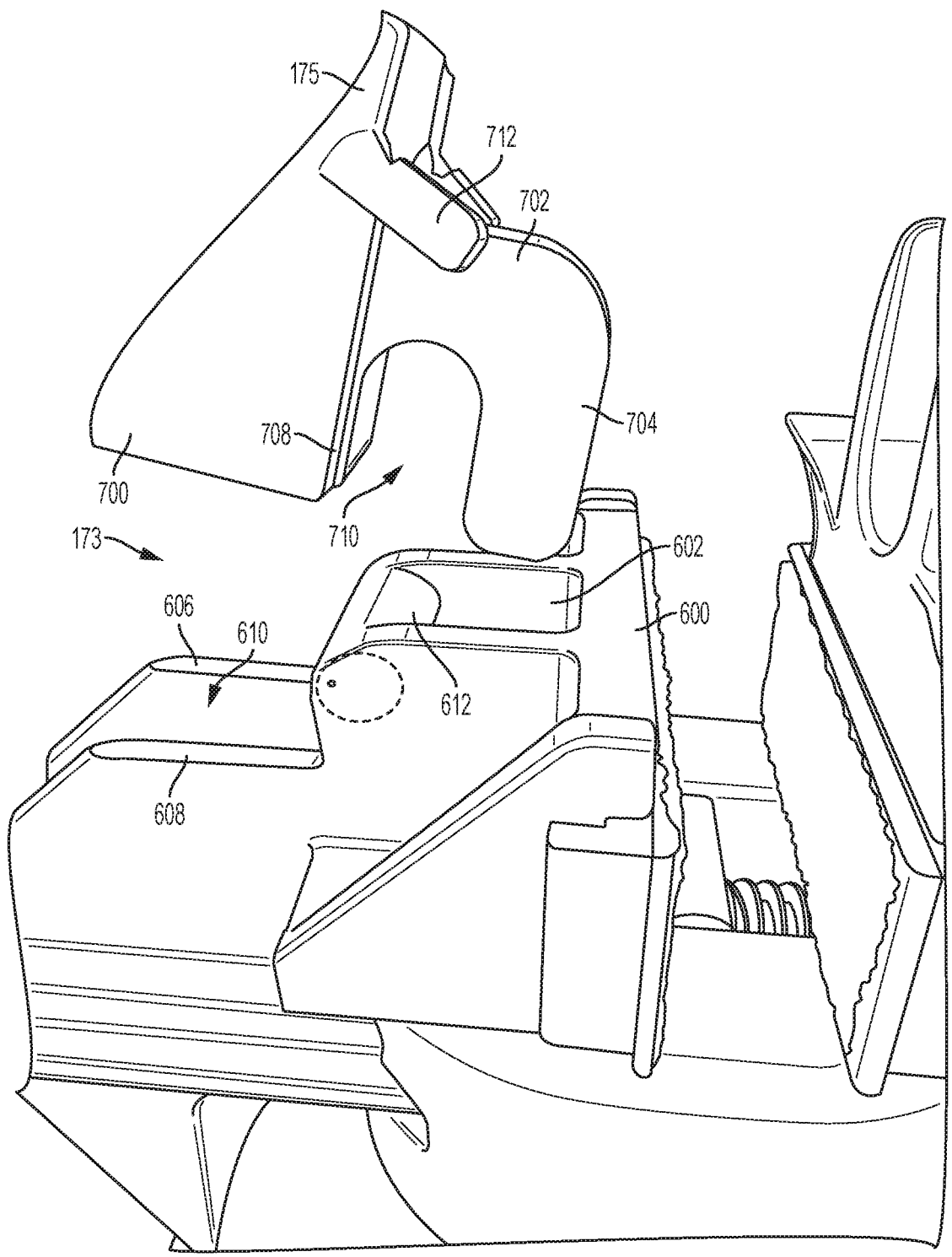
FIG. 9 illustrates a detail view of the second alignment portion separated from the device of FIG. 2.

Referring to FIG. 9, in operation, the second alignment portion 175 can be removably attached to the second body portion 173. For example, the first alignment projection 702 and/or the second alignment projection 704 can be inserted into the body portion opening 602. In an example, the second alignment projection 704 can be inserted between the body portion walls 600 and into the body portion opening 602. In this way, the rear body portion wall 612 of the second body portion 173 can be received within the alignment opening 710 of the second alignment portion 175. The alignment opening 710 can be sized to receive the rear body portion wall 612 such that the second body portion 173 can move (e.g., pivot and/or rotate) relative to the rear body portion wall 612. In an example, a width of the second alignment projection 704 can be less than a width of the body portion opening 602 or the rearward channel 610. As such, in this way, the second alignment projection 704 can be inserted into and removed from the body portion opening 602 and the rearward channel 610.

Figure 10:
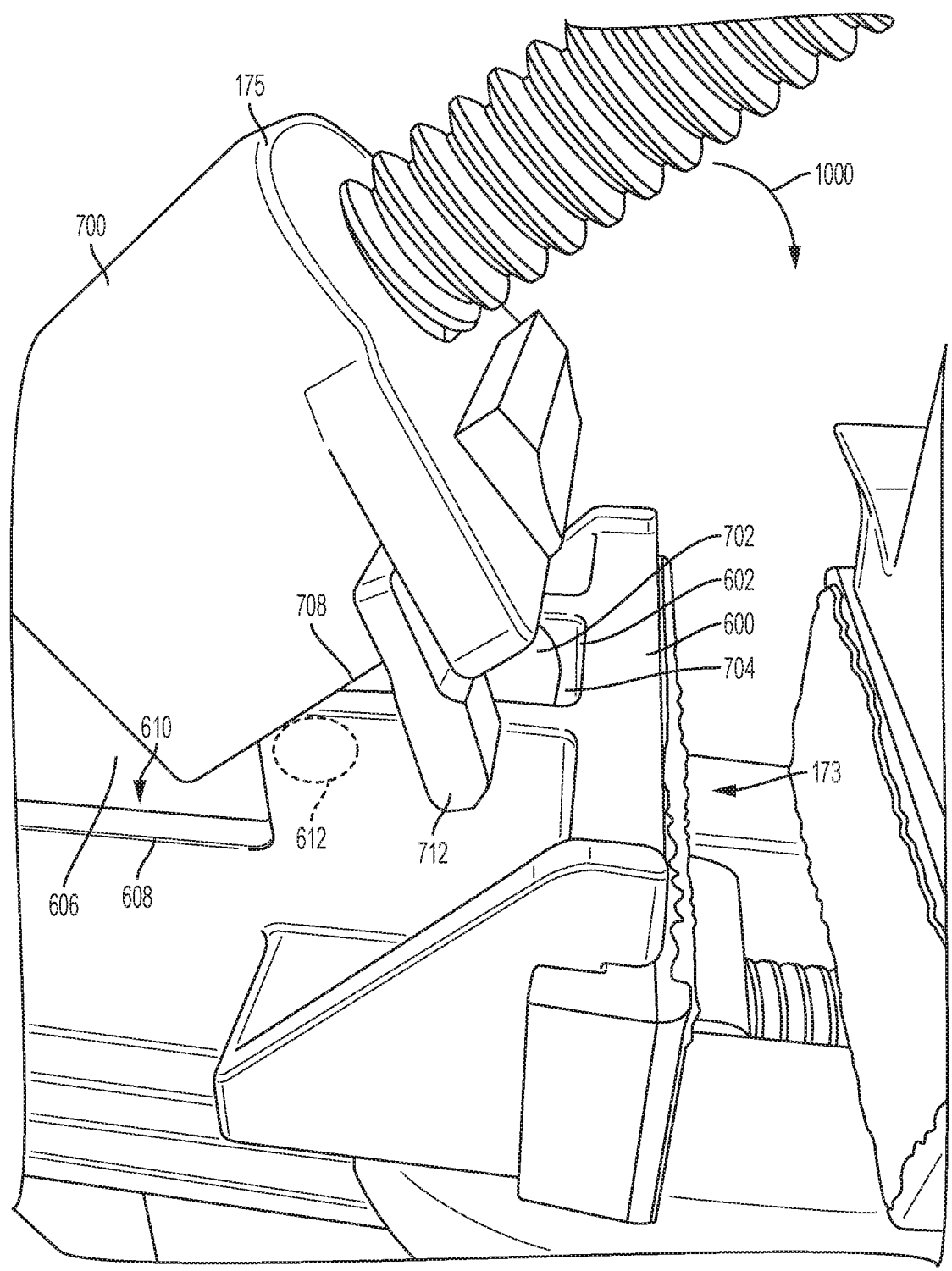
FIG. 10 illustrates rotation of the second alignment portion.

Referring to FIG. 10, once the first alignment projection 702 and/or the second alignment projection 704 have been inserted into the body portion opening 602 of the second body portion 173, the second alignment portion 175 can be rotated in a rotational direction 1000. In an example, the second alignment portion 175 can be rotated about the rear body portion wall 612, with the rear body portion wall 612 received within the alignment opening 710. The second alignment portion 175 can continue to be rotated along the rotational direction 1000 until the bottom surface 708 of the second alignment portion 175 contacts and/or engages a top of the body portion walls 600. Likewise, the alignment tabs 712 may also engage one of the body portion walls 600 (e.g., a front body portion wall) to limit further rotation of the second alignment portion 175.

Figure 11:
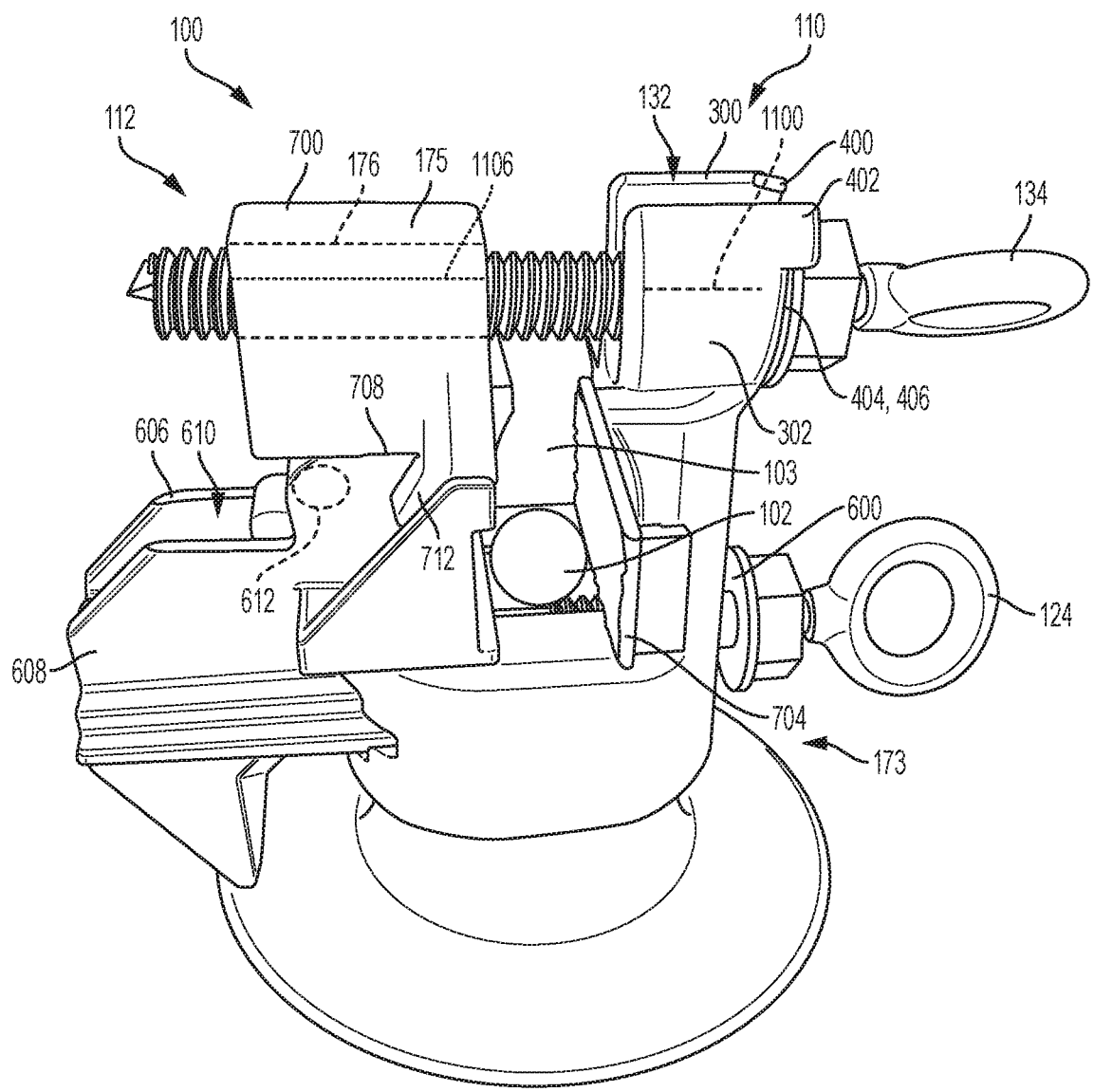
FIG. 11 illustrates the second alignment portion in a fully rotated position.

Referring to FIG. 11, the second alignment portion 175 is illustrated in a fully rotated position. That is, the second alignment portion 175 may not be able to rotate further along the rotational direction 1000. In an example, the second alignment portion 175 is illustrated in a first position. In the first position, a first alignment axis 1100, along which the first alignment opening 132 extends, may be parallel to (e.g., coaxial with) a second alignment axis 1106, along which the second alignment opening 176 extends.

In an example, in the first position, the first fastener 134 can be received within the first alignment opening 132 and the second alignment opening 176. For example, the first fastener 134 may be threaded (e.g., comprising a male threading) while the second alignment opening 176 may likewise be threaded (e.g., comprising a female threading). In an example, the lateral walls 300, 302 that define the first alignment opening 132 may not be threaded. As such, the first fastener 134 can move (e.g., slide, translate, rotate, etc.) within the first alignment opening 132.

In an example, the first fastener 134 can be maintained within the first alignment opening 132 and the second alignment opening 176. To reduce the likelihood of the first fastener 134 from becoming dislodged from the first alignment opening 132, the first retention structure 400 and the second retention structure 402 can maintain the first fastener 134 within the first alignment opening 132. For example, a head of the first fastener 132 can contact the front sides 404, 406 of the first portion 110. In an example, the head can be positioned below the first retention structure 400 and the second retention structure 402, with the head of the first fastener 132 abutting the first retention structure 400 and the second retention structure 402.

Due to the first retention structure 400 and the second retention structure 402 protruding outwardly from the front sides 404, 406 of the first portion 110, the first retention structure 400 and the second retention structure 402 can maintain the head of the first fastener 132 below the first retention structure 400 and the second retention structure 402. In this way, when the first fastener 132 is tightened relative to the alignment body 700 (e.g., due to the threading of the first fastener 132 engaging the threading of the second alignment opening 176) the head of the first fastener 134 can be moved into contact (e.g., leftward in FIG. 11) with the front sides 404, 406. With the head of the first fastener 134 contacting the front sides 404, 406, the head is limited from moving upwardly, due to the head of the first fastener 134 abutting the first retention structure 400 and the second retention structure 402. As such, the wire 102 may be maintained within the structure between the first portion 110 and the second portion 112.

Figure 12:
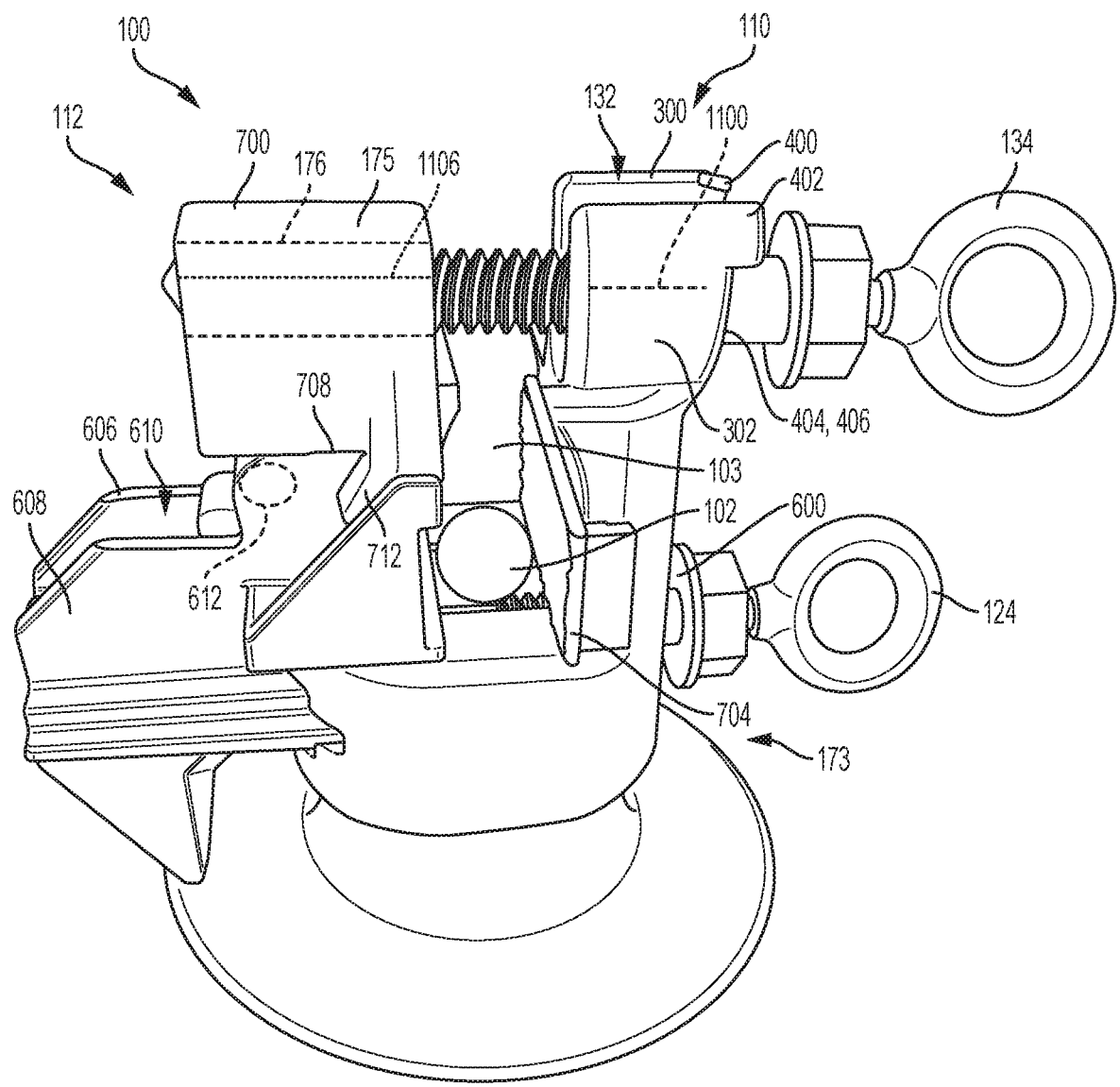
FIG. 12 is similar to FIG. 11 showing partial removal of a first fastener.

Referring to FIG. 12, in an example, the wire 102 can be removed from the wire opening 103. In an example, the first fastener 134 can be loosened from the alignment body 700, such as by rotating the first fastener 134 relative to the alignment body 700. As the first fastener 134 is loosened, the head of the first fastener 134 can move away from the front sides 404, 406 of the first portion 110. Further rotation of the first fastener 134 can cause the head of the first fastener 134 to move a distance apart from the front sides 404, 406 that is greater than a length of the retention structures 400, 402. Additional rotation of the first fastener 134 can stop once the head of the first fastener 134 is located the distance from the front sides 404, 406 that is greater than the length of the retention structures 400, 402.

Figure 13:
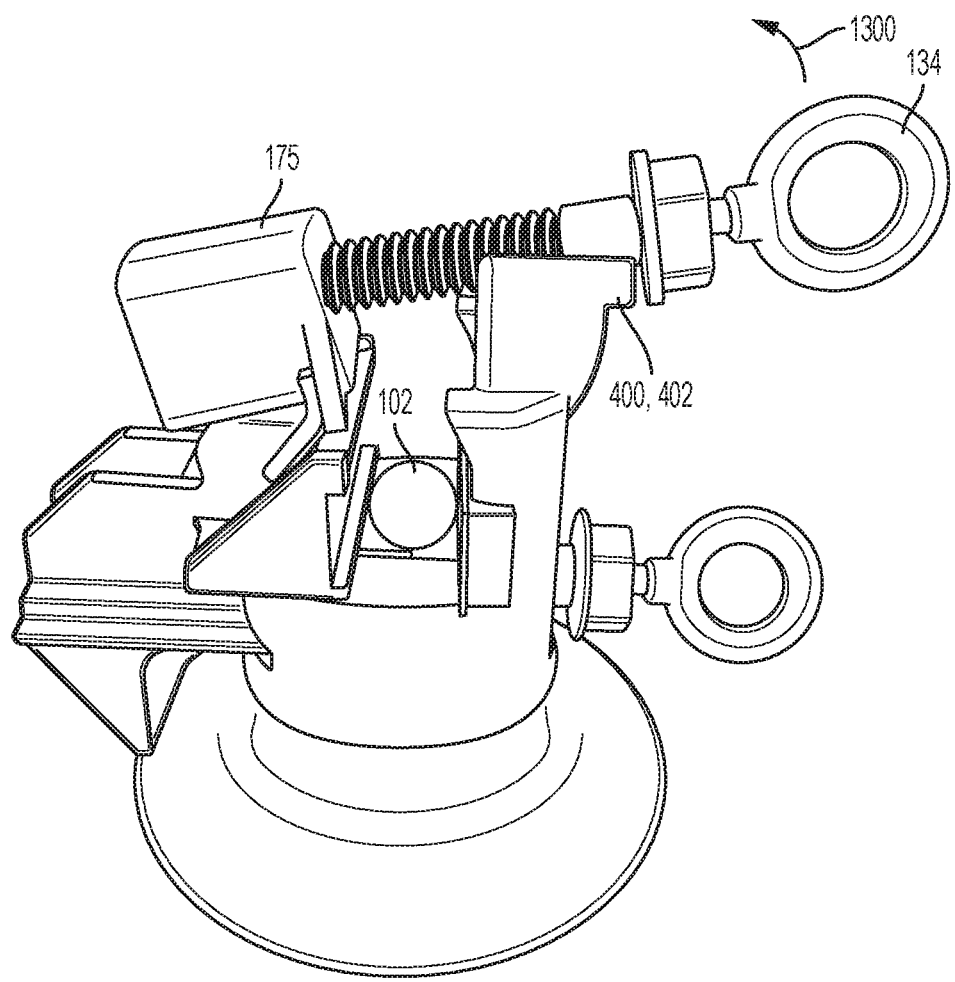
FIG. 13 is similar to FIG. 12 showing rotation of the first fastener.

Referring to FIG. 13, in an example, the first fastener 134 can be rotated in a second rotational direction 1300. As the first fastener 134 rotates, the second alignment portion 175 can likewise rotate relative to the second body portion 173. This rotation can allow the head of the first fastener 134 to bypass the retention structures 400, 402 as the head of the first fastener 134 moves upwardly.

Figure 14:
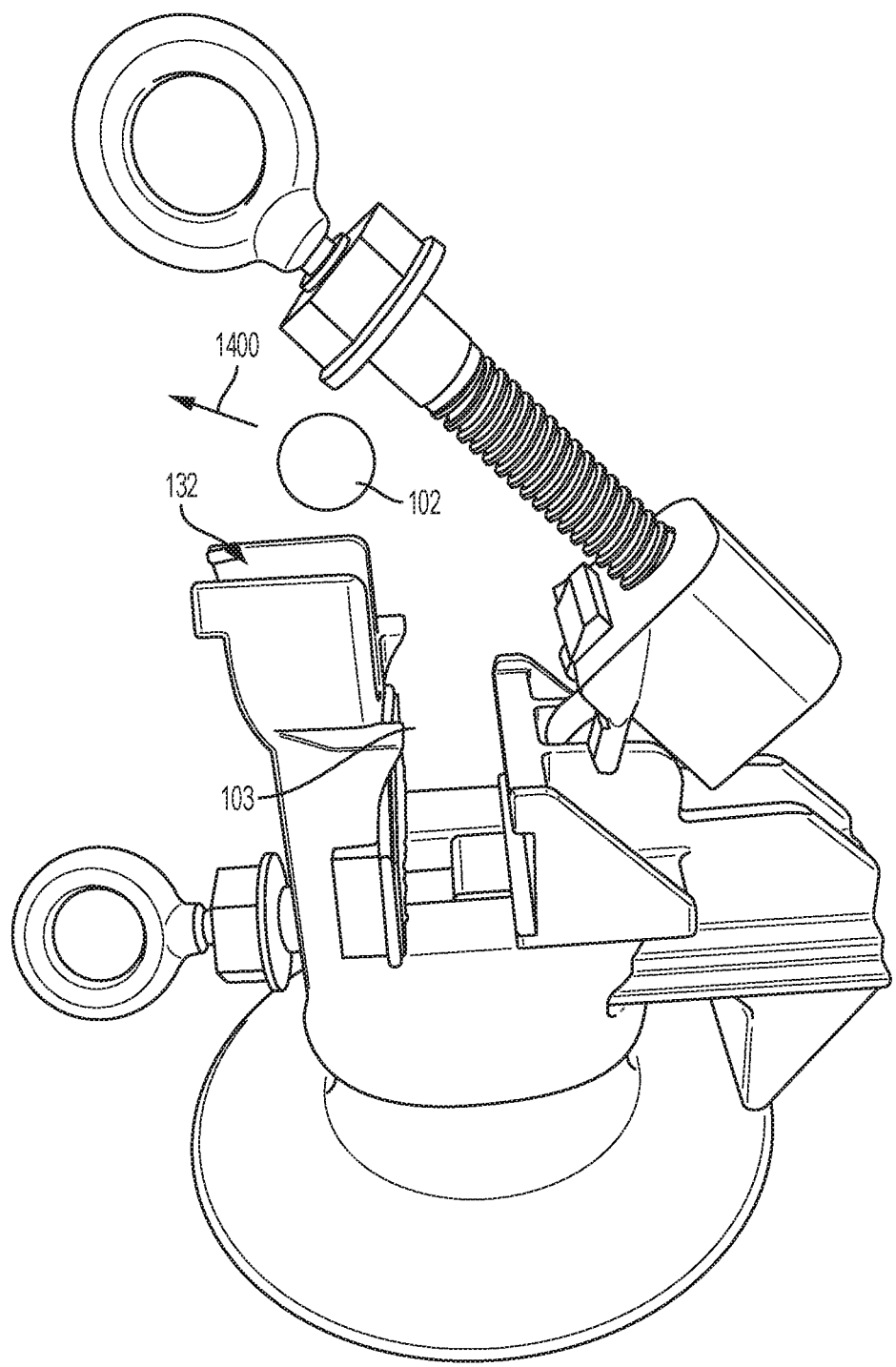
FIG. 14 is similar to FIG. 13 showing removal of the first fastener from a first alignment opening.

Referring to FIG. 14, in an example, the first fastener 134 can be removed from the first alignment opening 132. Once the first fastener 134 has been removed, the first fastener 134 can be spaced a distance apart from the lateral walls 300, 302. In an example, the distance separating the first fastener 134 from the lateral walls 300, 302 in FIG. 14 may be greater than a cross-sectional size of the wire 102. As such, in this way, the wire 102 can be removed from the structure 100. That is, for example, the wire 102 can be removed from the wire opening 103 by passing the wire through a gap defined between the lateral walls 300, 302 and the first fastener 134.

Figure 15:
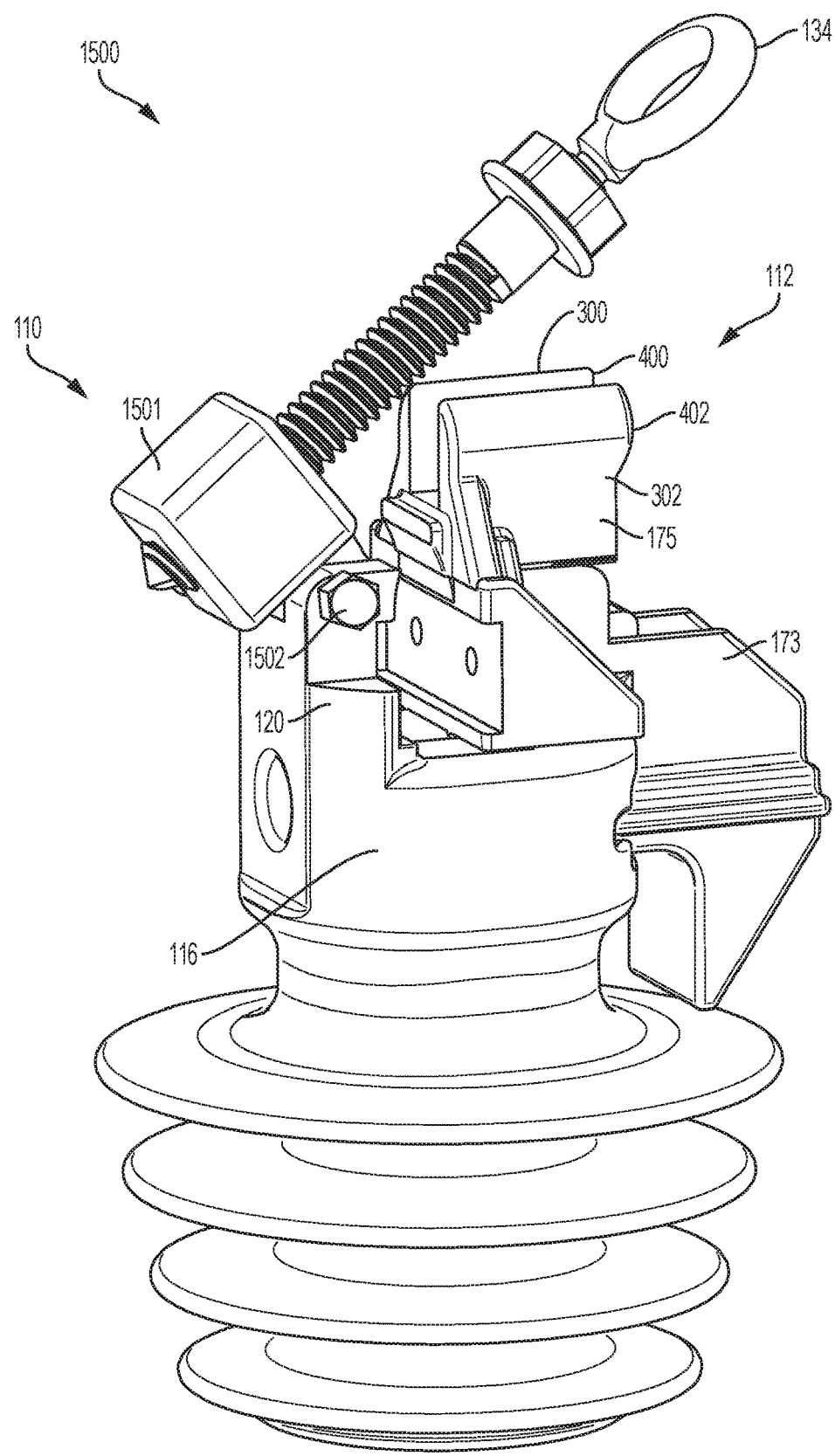
FIG. 15 illustrates another example insulating structure.

Referring to FIG. 15, a second example structure 1500 is illustrated. The structure 1500 is similar in some respects to the structure 100 illustrated with respect to FIGS. 1 to 14. For example, the structure 1500 comprises the first portion 110 and the second portion 112. The first portion 110 comprises the first body portion 120 and an alignment body 1501. The second portion 112 comprises the second body portion 173 and the second alignment portion 175. In an example, the second alignment portion 175 may be non-movably attached to the second body portion 173. Rather, in comparison to the second body portion 173 and the second alignment portion 175 of FIGS. 1 to 14, the second body alignment portion 175 is substantially non-movable with respect to the second body portion (e.g., such as by being fixed). In addition, in an example, the second alignment portion may comprise the first lateral wall 300, the second lateral wall 302, the first retention structure 400, the second retention structure 402, etc.

In an example, the first portion 110 comprises the alignment body 1501 which may be movably attached to the first body portion 120. In an example, the alignment body 1501 may be attached by a fastener 1502 to the first body portion 120, such that the alignment body 1501 may be pivotable relative to the first body portion 120 about an axis (e.g., about an axis along which the fastener 1502 extends). In an example, the first body portion 120 may define a threaded opening into which the first fastener 134 may be received. In this way, the male threading of the first fastener 134 can engage with the female threading of the opening of the alignment body 1501.

In operation, the structure 1500 can operate in a similar manner as the structure 100 illustrated in FIGS. 1 to 14. For example, the structure 1501 can receive the wire 102 between the first portion 110 and the second portion 112. The first fastener 134 can maintain the wire 102 in place between the first portion 110 and the second portion 112, thus limiting the likelihood of the wire 102 being inadvertently removed. To remove the wire 102, the first fastener 134 can be loosened from the alignment body 1501. As the first fastener 134 is loosened, a head of the first fastener can move away from the first lateral wall 300, the second lateral wall 302, the first retention structure 400, the second retention structure 402. In this way, a gap, a space, an opening, etc. may be defined between the head of the first fastener 134 and the first lateral wall 300, the second lateral wall 302, the first retention structure 400, the second retention structure 402.

With the first fastener 134 loosened, the first fastener 134 and the alignment body 1501 can be pivoted about the axis (e.g., about the axis along which the fastener 1502 extends). This pivoting can cause an opening to be defined between the first fastener 134 and the lateral walls 300, 302. In an example, the wire 102 can be removed from the structure 1500 by being passed through the opening defined between the first fastener 134 and the lateral walls 300, 302.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first portion and a second portion generally correspond to portion A and portion B or two different or two identical portions or the same portion.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A structure for supporting a wire, the structure comprising:
   a first portion comprising:
      a body portion; and
      an alignment portion movably coupled to the body portion, the alignment portion defining a first alignment opening through which the alignment portion is configured to receive a first fastener, the first alignment opening extending along a first alignment axis between a first side of the alignment portion and a second side of the alignment portion, a second portion defining a second alignment opening, extending along a second alignment axis, through which the second portion is configured to receive the first fastener such that the second portion is attached to the first portion by the first fastener when the first fastener is received within the first alignment opening and the second alignment opening, the second portion spaced a distance from the body portion to define a wire opening into which the wire is received for support by the structure;

wherein the alignment portion is movable relative to the body portion between:

a first position, in which the first alignment axis and the second alignment axis are coaxial; and a second position, in which the first alignment axis and the second alignment axis are non-coaxial.

2. The structure of claim 1, wherein the alignment portion is removably coupled to the body portion.

3. The structure of claim 1, wherein in the second position, the first alignment axis and the second alignment axis are non-parallel.

4. The structure of claim 3, wherein in the second position, the first fastener is not received within the second alignment opening.

5. The structure of claim 3, wherein in the second position, the first fastener is not in contact with the second portion.

6. The structure of claim 5, wherein in the second position, the first fastener is spaced a separating distance apart from the second portion.

7. The structure of claim 6, wherein the wire has a cross-sectional size that is less than the separating distance.

8. The structure of claim 1, wherein one of the first alignment opening or the second alignment opening is threaded.

9. The structure of claim 8, wherein the first alignment opening is threaded and the first fastener is threaded such that the first fastener threadingly engages the first alignment opening.

10. The structure of claim 1, wherein the first portion surrounds the first alignment opening.

11. The structure of claim 10, wherein the second portion partially surrounds the second alignment opening.

12. A structure for supporting a wire, the structure comprising:

a first portion comprising:

a body portion; and an alignment portion movably coupled to the body portion, the alignment portion defining a first alignment opening through which the alignment portion is configured to receive a first fastener, a second portion defining a second alignment opening through which the second portion is configured to receive the first fastener such that the second portion is attached to the first portion by the first fastener when the first fastener is received within the first alignment opening and the second alignment opening, the second portion spaced a distance from the body portion to define a wire opening into which the wire is received for support by the structure;

wherein the alignment portion is movable relative to the body portion between:

a first position, in which the wire opening is bounded by the first portion, the second portion, and the first fastener; and a second position, in which the wire opening is not bounded by the first fastener, and the first fastener is spaced a separating distance apart from the second portion.

13. The structure of claim 12, wherein the alignment portion is removably coupled to the body portion.

14. The structure of claim 12, wherein in the second position, the first fastener is not in contact with the second portion.

15. The structure of claim 12, wherein the wire has a cross-sectional size that is less than the separating distance.

16. The structure of claim 12, wherein one of the first alignment opening or the second alignment opening is threaded.

17. The structure of claim 16, wherein the first alignment opening is threaded and the first fastener is threaded such that the first fastener threadingly engages the first alignment opening.

18. The structure of claim 12, wherein the first portion surrounds the first alignment opening.

19. The structure of claim 18, wherein the second portion partially surrounds the second alignment opening.

20. A structure for supporting a wire, the structure comprising:

a first portion comprising:

a body portion; and an alignment portion movably coupled to the body portion, the alignment portion defining a first alignment opening through which the alignment portion is configured to receive a first fastener, the first alignment opening extending along a first alignment axis between a first side of the alignment portion and a second side of the alignment portion, a second portion defining a second alignment opening, extending along a second alignment axis, through which the second portion is configured to receive the first fastener such that the second portion is attached to the first portion by the first fastener when the first fastener is received within the first alignment opening and the second alignment opening, the second portion spaced a distance from the body portion to define a wire opening into which the wire is received for support by the structure;

wherein the alignment portion is movable relative to the body portion between:

a first position, in which the first fastener maintains the wire within the wire opening; and a second position, in which the first fastener does not maintain the wire within the wire opening.

* * * * *